US011782619B1

(12) United States Patent
Hiregoudar (10) Patent No.: US 11,782,619 B1
(45) Date of Patent: Oct. 10, 2023

(54) IN-PLACE CONVERSION OF VIRTUAL DISK FORMATS WITH VM POWERED ON

(71) Applicant: VMware, Inc., Palo Alto, CA (US)

(72) Inventor: Mahesh Hiregoudar, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 8 days.

(21) Appl. No.: 17/703,904

(22) Filed: Mar. 24, 2022

(51) Int. Cl.
*G06F 3/06* (2006.01)

(52) U.S. Cl.
CPC ............ *G06F 3/0634* (2013.01); *G06F 3/067* (2013.01); *G06F 3/0617* (2013.01); *G06F 3/0664* (2013.01)

(58) Field of Classification Search
None
See application file for complete search history.

(56) References Cited

U.S. PATENT DOCUMENTS

2015/0006787 A1*  1/2015  Liu ..................... G06F 3/0604
                                                       711/103
2018/0329643 A1* 11/2018  Kurjanowicz ...... G06F 9/45558

OTHER PUBLICATIONS

Stanisic, Srdjan et al. "Changing the virtual disk's format", https://mivilisnet.wordpress.com/2019/03/26/changing-the-virtual-disks-format/, Mar. 26, 2019, 5 pgs.

Lee, Brandon, "How to convert VHD to VHDX Disks with Hyper-V", Aug. 22, 2018, 19 pgs.
Microsoft, "Convert-VHD", https://docs.microsoft.com/en-us/powershell/module/hyper-v/convert-vhd?view=windowsserver2022-ps, retrieved Mar. 10, 2022, 16 pgs.
VMware, "vSphere Storage 7.0", https://docs.vmware.com/en/VMware-vSphere/7.0/vsphere-esxi-vcenter-server-70-storage-guide.pdf, Aug. 15, 2020, 398 pgs.

* cited by examiner

*Primary Examiner* — Brian R Peugh (74) *Attorney, Agent, or Firm* — LOZA & LOZA, LLP (57) ABSTRACT

System and method for converting disk format types of virtual disks in storage executes, in response to a request to convert a disk format type of a target virtual disk from a source disk format type to a destination disk format type, a conversion procedure on each data block of the target virtual disk that satisfies a predefined condition. The conversion procedure executed is based on the source and destination disk format types. The conversion procedure includes taking possession of a granular offset lock for a data block of the target virtual disk, performing a conversion operation on the data block of the target virtual disk only when the data block of the target virtual disk satisfies a required condition, and releasing the granular offset lock for the data block of the target virtual disk after the conversion operation on the data block has been performed.

20 Claims, 7 Drawing Sheets

IN-PLACE CONVERSION OF VIRTUAL DISK FORMATS WITH VM POWERED ON

BACKGROUND

As storage systems evolve, they are adopting more and more software policy based management (SPBM) to overcome upfront storage provisioning challenges, such as capacity planning, differentiated service levels and managing capacity headroom. SPBM solutions can provide very flexible options for different storage entities in those software based policies so that users can choose storage entities that best suit their storage requirements. However, as their applications evolve over time, their storage requirements may also change, which may not be suitable for the storage entities currently being used to support the applications.

For example, in a virtual machine setup, an administrator may select a thin provisioning option for virtual disks, keeping in mind of its storage space efficiency benefits. However, as applications evolve, their storage requirements may also change. Thus, sometime after the initial storage selection, the administrator may want to switch to a thick provisioning type for a subset of those virtual disks because of its performance benefits or space reservation aspects. Conversely, the administrator may want to switch some of the virtual disks from the thick provisioning type to the thin provisioning type.

Thus, users want to be able to dynamically switch between various options in the storage environment based on evolving requirements. However, at the same time, users may not want to disrupt their running applications and their workloads, which has not been met with conventional storage systems. Thus, there is a need for a storage solution that allows users to dynamically switch between various storage entity options with their application workloads running.

BRIEF DESCRIPTION OF THE DRAWINGS

Throughout the description, similar reference numbers may be used to identify similar elements.

DETAILED DESCRIPTION

Figure 1:
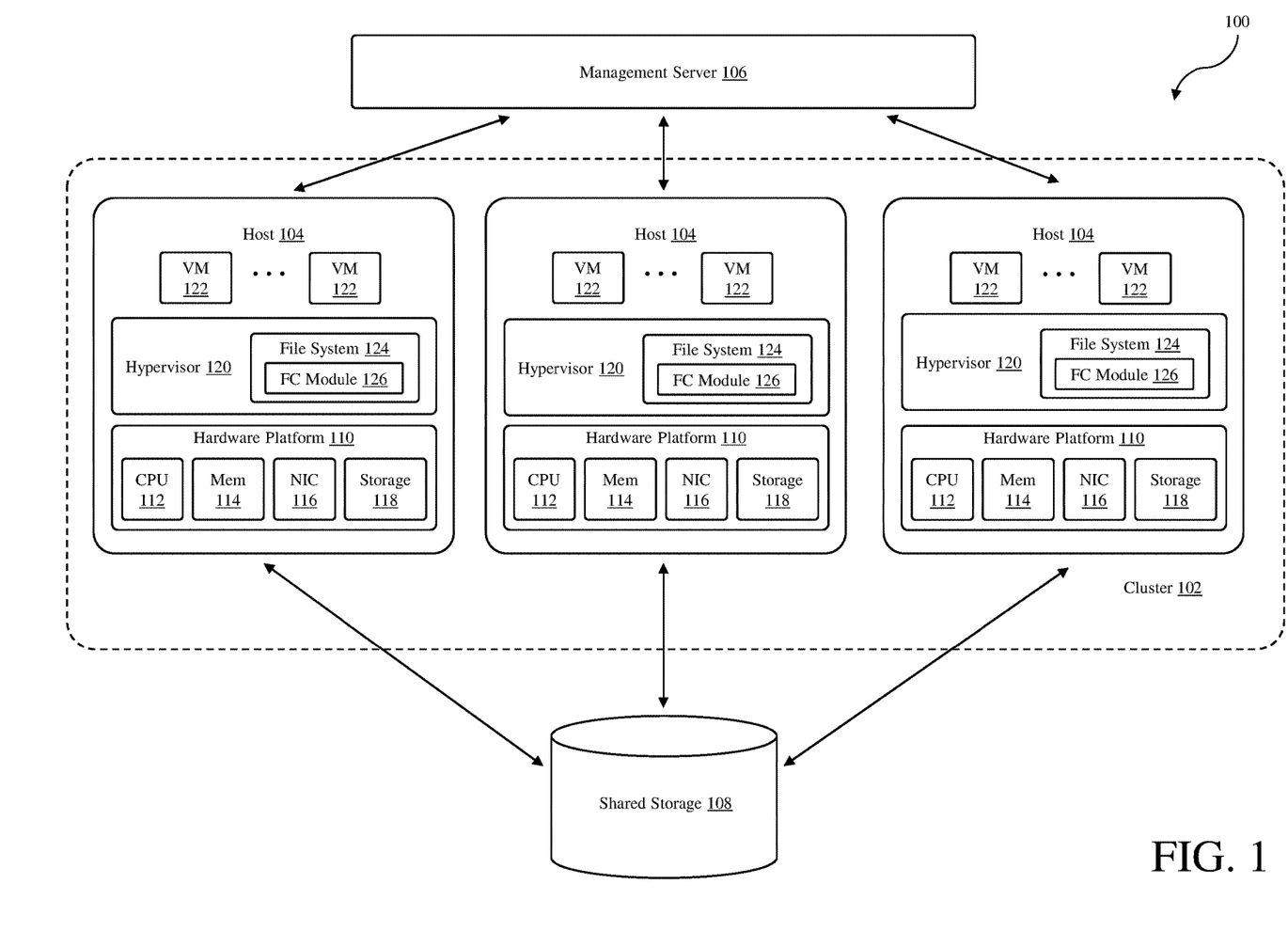
FIG. 1 is a block diagram of a computing system in which embodiments of the invention may be implemented.

FIG. 1 illustrates a computing system 100 in which embodiments of the invention may be implemented. As shown in FIG. 1, the computing system 100 includes a cluster 102 of host computers 104, a management server 106 and shared storage 108. The cluster 102 of host computers 104 is shown to include a number of host computers 104, which may vary in some embodiments from a few host computers to dozens or more host computers.

Each of the host computers 104 in the computing system 100 is configured to support a number of virtual computing instances. As used herein, the term "virtual computing instance" refers to any software processing entity that can run on a computer system, such as a software application, a software process, a virtual machine or a virtual container. A virtual machine is an emulation of a physical computer system in the form of a software computer that, like a physical computer, can run an operating system and applications. A virtual machine may be comprised of a set of specification and configuration files and is backed by the physical resources of the physical host computer. A virtual machine may have virtual devices that provide the same functionality as physical hardware and have additional benefits in terms of portability, manageability, and security. An example of a virtual machine is the virtual machine created using VMware vSphere® solution made commercially available from VMware, Inc of Palo Alto, Calif. A virtual container is a package that relies on virtual isolation to deploy and run applications that access a shared operating system (OS) kernel. An example of a virtual container is the virtual container created using a Docker engine made available by Docker, Inc. In this disclosure, the virtual computing instances will be described as being virtual machines, although embodiments of the invention described herein are not limited to virtual machines (VMs).

As shown in FIG. 1, each of the host computers 104 includes a physical hardware platform 110, which includes at least one or more processors 112, one or more system memories 114, a network interface 116 and storage 118. Each processor 112 can be any type of a processor, such as a central processing unit (CPU) commonly found in a server computer. Each system memory 114, which may be random access memory (RAM), is the volatile memory of the host computer. The network interface 116 can be any interface that allows the host computer to communicate with other devices through one or more computer networks. As an example, the network interface 116 may be a network interface controller (NIC). The storage 118 can be any type of non-volatile computer storage with one or more local storage devices, such as solid-state devices (SSDs) and hard disks. In an embodiment, the storages 118 of the different host computers 104 may be used as the shared storage 108, which can be accessed by any of the processes running on the host computers 104.

Each host computer 104 further includes a virtualization software 120 running directly on the hardware platform 110 or on an operation system (OS) of the host computer. The virtualization software 120 can support one or more VCIs 122, which are VMs in the illustrated embodiment. In addition, the virtualization software 120 can deploy or create VCIs on demand. Although the virtualization software 120 may support different types of VCIs, the virtualization software 120 is described herein as being a hypervisor, which enables sharing of the hardware resources of the host computer by the VMs 122 that are hosted by the hypervisor. One example of a hypervisor that may be used in an embodiment described herein is a VMware ESXi™ hypervisor provided as part of the VMware vSphere® solution made commercially available from VMware, Inc. of Palo Alto, Calif.

The hypervisor 120 in each host computer 104 provides a device driver layer configured to map physical resources of the hardware platform 110 to "virtual" resources of each VM supported by the hypervisor such that each VM has its own corresponding virtual hardware platform. Each such virtual hardware platform provides emulated or virtualized hardware (e.g., memory, processor, storage, network interface, etc.) that may function as an equivalent to conventional hardware architecture for its corresponding VM.

With the support of the hypervisor 120, the VMs 122 in each host computer 104 provide isolated execution spaces for guest software. Each VM may include a guest operating system (OS) and one or more guest applications. The guest OS manages virtual hardware resources made available to the corresponding VM by the hypervisor 120, and, among other things, the guest OS forms a software platform on top of which the guest applications run.

The hypervisor 120 in each host computer 104 includes a file system 124, which manages data stored in the shared storage 108. Thus, the file system 124 handles file system operations, such as write and read operations on files stored in the shared storage 108. In an embodiment, the file system 124 is a shared file system, which can be accessed and managed by the different host computers 104 in the cluster 102. As an example, the file system 124 may be a virtual machine file system (VMFS), which is a VMware specific file system to virtualize VM's storage space. In this embodiment, the file system 124 may be used to efficiently store virtual disks of the VMs 122 and easily create snapshots of the virtual disks. The virtual disks stored in the shared storage can be different types of virtual disks, such as thin-provisioned virtual disks (sometimes referred to herein as "thin virtual disks"), thick-provisioned virtual disks (sometimes referred to herein as "thick virtual disks") and lazy-zeroed-thick (LZT) provisioned virtual disks (sometimes referred to herein as "LZT virtual disks").

Thick-provisioned virtual disks are virtual disks that are pre-allocated with all the space specified during the creation of the disks. For example, if a 10 megabyte (MB) virtual disk is created, then all 10 MB are pre-allocated for that virtual disk in physical storage. Thin-provisioned virtual disks are virtual disks that are not pre-allocated with all the space specified during the creation of the disks. Some of the blocks in a thin-provisioned virtual disk are not allocated and backed by physical storage until these blocks are written during the normal course of operation. Reading an unallocated block of a thin-provisioned virtual disk returns zeroes, but the block is not backed with physical storage until it is written. LZT-provisioned virtual disks are similar to the thick-provisioned virtual disk in that these virtual disks are pre-allocated with all the space specified during the creation of the disks. However, the blocks of a LZT-provisioned virtual disk are not initially zeroed out to delete any old underlying data. Zeroing out is done at a later time when new data to the disk is written for the first time. LZT-provisioned virtual disks manage this by storing to-be-zeroed (TBZ) bits in the file metadata.

Thus, depending on different requirements, users may want to dynamically switch between various virtual disk options. However, users may not want any disruptions with respect to the running applications and their workloads. For example, in a virtual machine setup, an administrator may initially select a thin provisioning option for virtual disks, keeping in mind of its storage space efficiency benefits. However, as the applications evolve, the storage requirements for the computing system may also change. Thus, sometime after the initial storage selection, the users may want to switch to a thick provisioning type for a subset of those virtual disks because of its performance benefits or space reservation aspects. Conversely, the users may want to switch some of their virtual disks from the thick provisioning type to the thin provisioning type.

Converting the virtual disk format while the VM is powered on has challenges. For example, consider the case of converting the virtual disk format from the thin provisioning type to the thick provisioning type. One approach to do this conversion is to scan the entire virtual disk by reading each 1 MB file block at each 1 MB offset. If the data read is all zeroes, it is assumed that it must be an unplugged disk offset (i.e., file hole), which is an unallocated file block (i.e., not written in physical storage). Thus, a data write request with all zero buffer is sent to that disk offset. This will allocate a file block to that offset and initialize it with zeroes (i.e., written in physical storage with zeroes). This process has to be done for the entire virtual disk until the file holes are plugged by allocating new file blocks so that the virtual disk becomes thick provisioned.

There are two disadvantages with this approach. First, even if there is a plugged block and its data is all zeroes (i.e., a block with all zeroes that is written in physical storage), the conversion process will still blindly do a write with all zeroes to this block, which is unnecessary for the block. Second, when a VM is powered on and issuing write command to the VM's disk, this conversion approach can corrupt the VM's disk. This is because a conversion based zero data write command and VM write command can race each other. In absence of a synchronization mechanism between the two, if the conversion based write occurs after a VM data write, the conversion-based write will erase the data written by the VM and the VM data will get lost because the VM cannot distinguish between the two types of write commands.

Another file format conversion approach is a copy-based method, which involves copying one or more virtual disks and simultaneously converting the file format of the virtual disk copies to a new file format. Disadvantages of this approach is that it uses significant amount of resources, such as storage space, network bandwidth, memory and compute resources.

In order to resolve these disadvantages, the hypervisor 120 in each host computer 104 includes a file conversion (FC) module 126 that converts the file format type of virtual disks stored in the shared storage 108 without unnecessarily plugging blocks of the virtual disks, without erasing recently written VM data, and without making a copy of the target virtual disk. The file conversion module 126 is described in more detail below.

The management server 106 of the computing system 100 operates to manage and monitor the host computers 104. The management server 106 may be configured to monitor the current configurations of the host computers 104 and any VCIs, e.g., VMs 122, running on the host computers. The monitored configurations may include hardware configuration of each of the host computers 104 and software configurations of each of the host computers. The monitored configurations may also include VCI hosting information, i.e., which VCIs are hosted or running on which host computers 104. The monitored configurations may also include information regarding the VCIs running on the different host computers 104.

In some embodiments, the management server 106 may be a physical computer. In other embodiments, the management server may be implemented as one or more software programs running on one or more physical computers, such as the host computers 104, or running on one or more VCIs, which may be hosted on any of the host computers. In an implementation, the management server 106 is a VMware vCenter™ server with at least some of the features available for such a server.

The shared storage 108 can be any type of storage that is accessible to the host computers 104 in the cluster 102. In an embodiment, the shared storage 108 is formed using the local storages 118 of the host computers 104 in the cluster 102. In other embodiments, the shared storage 108 may be, but not limited to, a network attached storage (NAS), a storage area network (SAN) or a redundant array of independent disks (RAID).

The file system 124 in each of the host computers 104 uses a granular locking mechanism so that a lock can be used for parts of a file rather than the entire file. A granular offset lock is a bitwise lock that can be maintained in pointer blocks (PBs). For each PB, the granular offset locks can be stored in a bitmap with each bit representing a lock for a predefined offset (e.g., 1 MB offset) in that PB. As an example, a PB page may cover 512 MB address space. This lock is taken when there is any file system transaction for the corresponding offset, such as plugging (i.e., mapping) a block to that offset or unplugging (i.e., unmapping) a block at that offset, in order to prevent another file system transaction from accessing the same block.

Figure 2A:
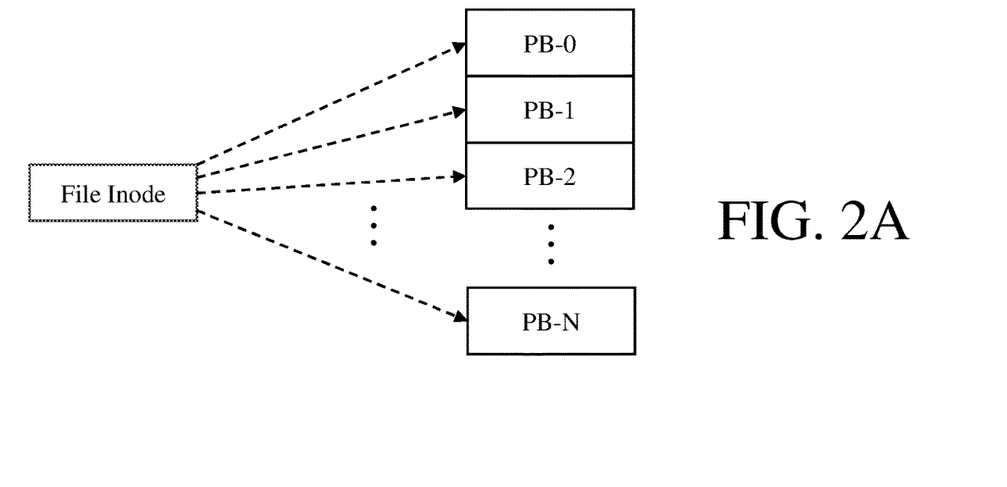
FIG. 2A illustrates an example of a file inode of a virtual disk used in the computing system in accordance with an embodiment of the invention.
Figure 2B:
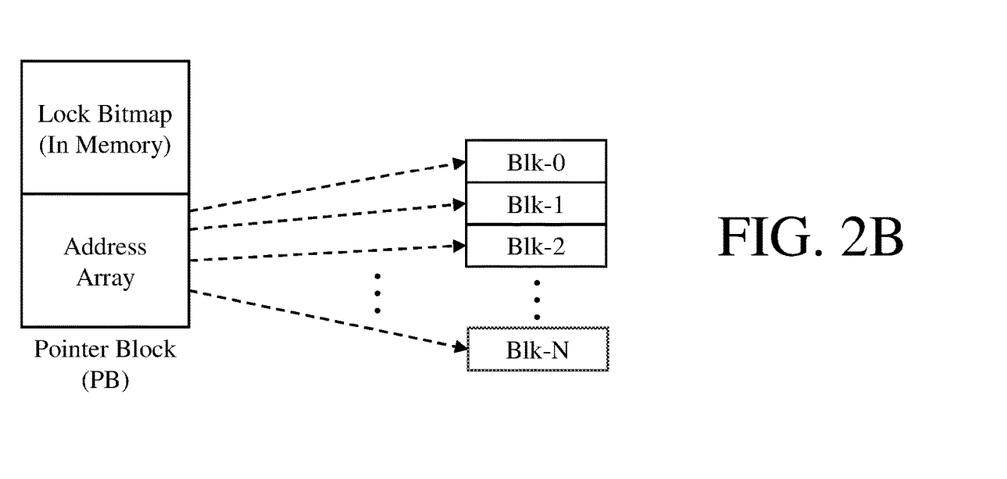
FIG. 2B is an in-memory representation of an example of a pointer block (PB) used in the computing system in accordance with an embodiment of the invention.
Figure 2C:
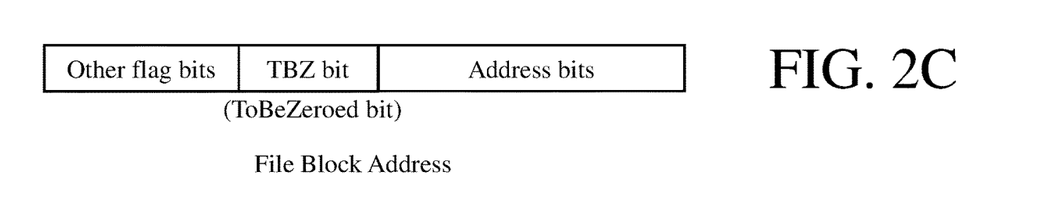
FIG. 2C illustrates a data structure of an example of a file block address used in the computing system in accordance with an embodiment of the invention.

The file system 124 uses file descriptors or file inodes, which each includes the addresses of the pointer blocks (PBs) that store the addresses of file blocks of the file, e.g., a virtual disk. An example of a file inode of a virtual disk used by the file system 124 in accordance with an embodiment of the invention is illustrated in FIG. 2A. As shown in FIG. 2A, the file inode points to a number of PBs, PB-0 to PB-N. Each of these PBs includes the addresses of file blocks of the virtual disk. An in-memory representation of an example of a PB used by the file system 124 in accordance with an embodiment of the invention is illustrated in FIG. 2B. As shown in FIG. 2B, the PB includes a lock bitmap field with a lock bit for each file block address in the PB. This is the granular lock bitmap used for synchronizing block offsets during various input/output (IO) workflows, as described below. The PB also includes an address array that stores addresses of the file blocks Blk-0 to Blk-N of the virtual disk. Also shown in FIG. 2C is a data structure of an example of a file block address used by the file system 124 in accordance with an embodiment of the invention. As illustrated, the file block address includes a to-be-zeroed (TBZ) bit field to denote whether the file block is initialized with zeroes or not. For example, a "0" TBZ bit in the TBZ bit field may indicate that the file block is not initialized with zeroes and a "1" TZB bit in the TBZ bit field may indicate that the file block is initialized with zeroes. The file block address also includes address bits for the file block and other flag bits.

As described below, the file conversion module 126 in each of the host computers 104 uses the granular locking mechanism of the file system 124 and the TBZ bit field in the file block addresses to convert source file format types of target virtual disks to destination file format types using a block-by-block conversion process. The granular locking mechanism of the file system 124 allows the file conversion module 126 to convert the target virtual disks on a block-by-block basis so that the entire file is not locked during the conversion process, which would be very disruptive to the virtual computing instance using the target virtual disks. In addition, the granular locking mechanism of the file system 124 is used by the file conversion module 126 to synchronize the writes performed on a virtual disk for a file conversion process with the writes performed on the same virtual disk for one or more virtual computing instances, e.g., VMs. The TBZ bit field in the address of each file block of the target virtual disk allows the file conversion module 126 to quickly determine whether a file block of the target virtual disk contains all zeros so a write operation with all zeros is not unnecessarily performed on file blocks that already contain all zeroes.

Figure 3:
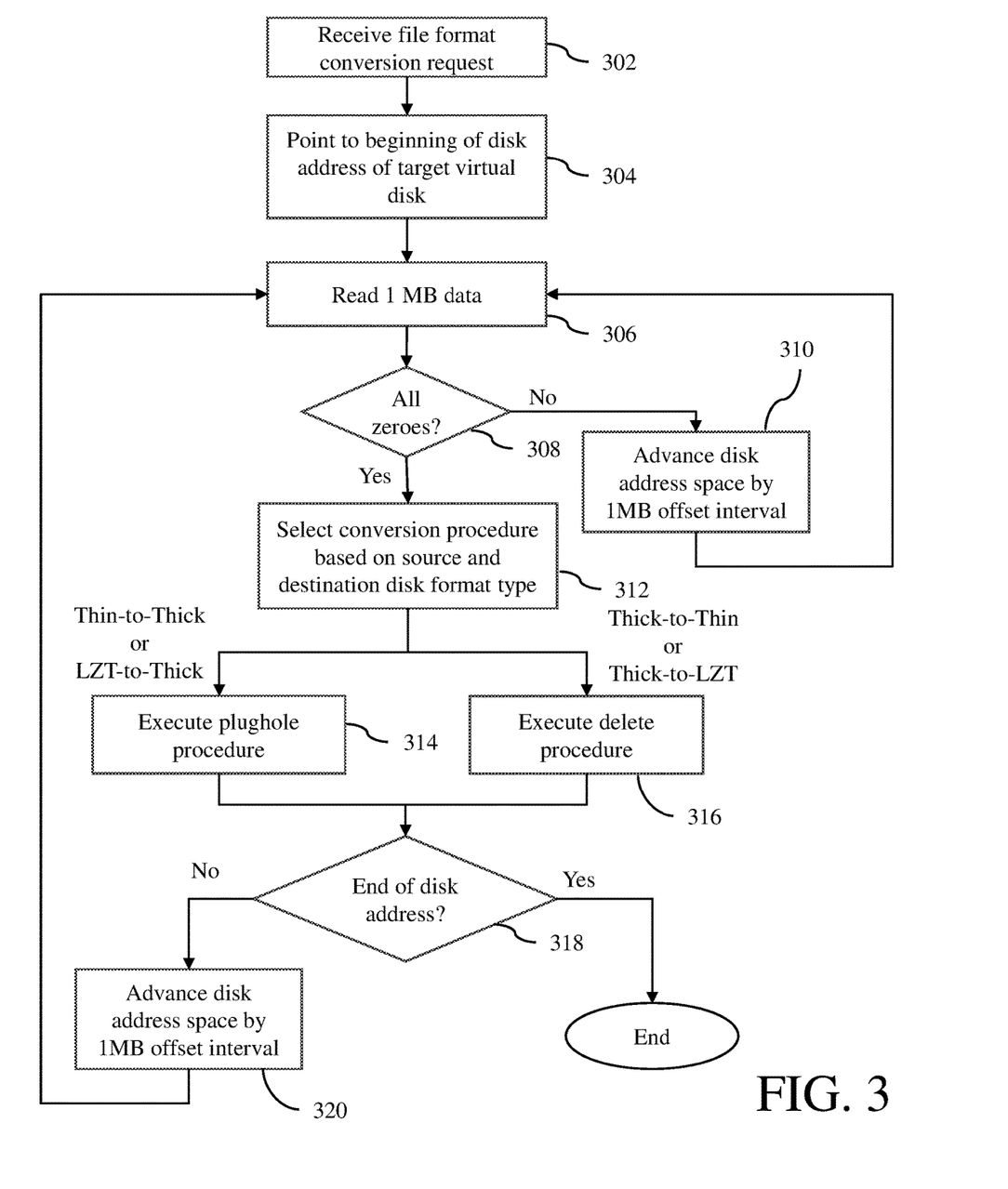
FIG. 3 is a flow diagram of a process of converting a target virtual disk from a source disk format type to a destination disk format type in accordance with an embodiment of the invention.

The process of converting a target virtual disk from a source disk format type to a destination disk format type in accordance with an embodiment is described with reference to a process flow diagram of FIG. 3. The file format conversion process begins at step 302, where a request to convert the target virtual disk from the source disk format type to the destination disk format type is received by the file conversion module 126 of the file system 124 in the host computer 104 associated with the target virtual disk, which may be the host computer on which the VM of the target virtual disk is hosted. However, in other embodiments, the request may be received by the file conversion module 126 of the file system 124 in any of the host computers 104 in the cluster 102 that can access the target virtual disk. The source and destination disk format types can be any number of various virtual disk format types, such as thin virtual disk type, thick virtual disk type and LZT virtual disk type. The file format request may have originated from a graphic user interface (GUI), which may be a web-based GUI or an application GUI, or from a software process, such as a management application running on the management server 106. In an embodiment, the file format request may be an application programming interface (API) call to the particular file conversion module 126.

Next, at step 304, in response to the file format conversion request, a file pointer is placed at the beginning of the disk address of the target virtual disk by the file conversion module 126. Next, at step 306, one (1) megabyte (MB) of data (i.e., 1 MB file block) of the target virtual disk is read by the file conversion module 126.

Next, at step 308, a determination is made by the file conversion module 126 whether the data that was read is all zeros, which is a predefined condition that is checked to see whether the file block needs to be processed for the conversion, e.g., deleted or plugged and initialized with zeroes. In an embodiment, the TBZ field bit of the block address is read to determine whether the data in the current file block is all zeroes. If the data is not all zeros, the file pointer is advanced in the disk address space by one (1) MB offset interval by the file conversion module 126, at step 310, since the current file block does not have to be processed for the conversion. The process then proceeds back to step 306, where the next one (1) MB of data is read. However, if the data is all zeros, then the process proceeds to step 312.

At step 312, a conversion procedure to be performed for the current data block (i.e., current one (1) MB of virtual disk data) is selected by the file conversion module 126 based on the source and destination disk format types. The procedure that can be selected is a plughole procedure or a delete procedure operation. If the disk format type conversion is from thin to thick or LZT to thick, then a plughole procedure is selected. If the disk format type conversion is from thick to thin or thick to LZT, then a delete procedure is selected.

Figure 4:
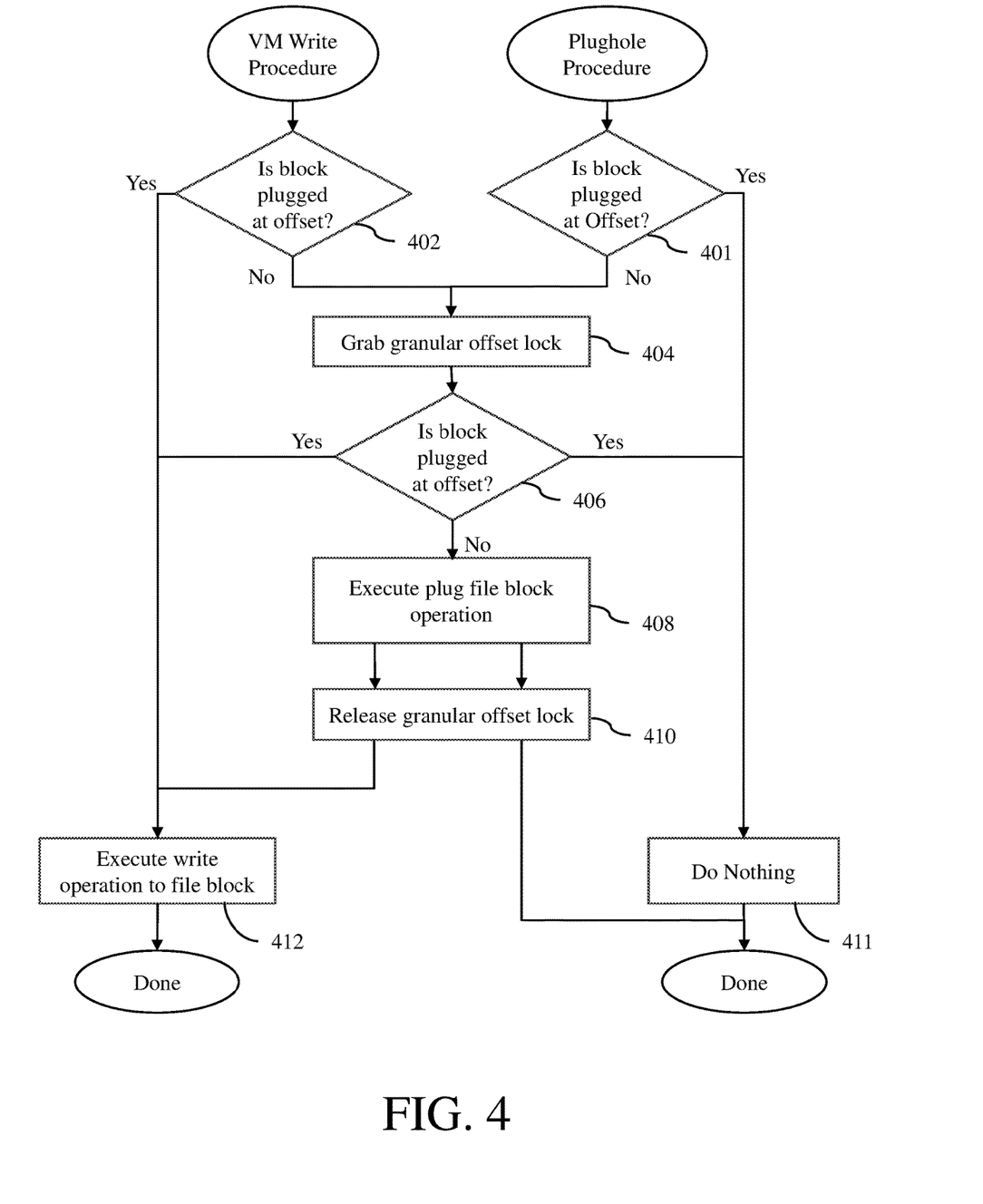
FIG. 4 is a process flow diagram of a plughole procedure of the file format conversion process shown in FIG. 3 in accordance with an embodiment of the invention.

If a plughole procedure is selected, then at step 314, a plughole operation is executed by the file conversion module 126, which is described in detail below with reference to FIG. 4. However, if a delete procedure is selected, then at step 316, a delete procedure is executed by the file conversion module 126, which is described in detail below with reference to FIG. 5. In an embodiment, these procedures may be initiated by issuing certain commands in the file system 124. After either the plughole procedure or the delete procedure, the proceeds to step 318, where a determination is made whether the end of the disk address has been reached, i.e., the last one (1) MB of virtual disk data (i.e., last 1 MB file block) has been processed.

If the end of the disk address has been reached, the process then comes to an end. However, if the end of the disk address has not been reached, the process then proceeds to step 320, where the file pointer is advanced in the disk address space by one (1) MB offset interval by the file conversion module 126. The process then proceeds back to step 306 to process the next one (1) MB block of the target virtual disk. In this manner, the entire target virtual disk is processed one (1) MB of data at a time to convert the disk format type from the source disk format type to the source disk format type.

The plughole procedure of the file format conversion process shown in FIG. 3 in accordance with an embodiment is described with reference to a process flow diagram of FIG. 4, which also shows a VM write procedure that may race or compete with the plughole procedure. The plughole procedure begins at step 401, where a determination is made by the file conversion module 126 whether the data block at the current offset is plugged. If yes, then no action is taken, at step 411. The procedure is then finished for the current data block of the target virtual disk.

However, if the data block is not plugged at the current offset, the procedure proceeds to step 404, where the granular offset lock for the data block is grabbed to proceed with the plughole procedure, which would be reflected in the lock bitmap in the appropriate pointer block (PB). Next, at step 406, a determination is made by the file conversion module 126 whether the current data block at the current offset is plugged. If yes, which means that a VM write procedure has plugged the current data block since step 401, then no action is taken and the procedure is finished.

However, if the data block at the current offset is still not plugged, the procedure proceeds to step 408, where a plug file block operation is performed. The plug file block operation involves plugging the current file block (i.e., allocating the block in physical storage) and initializing the file block with zeros (i.e., all zeroes are written to the file block). Next, at step 410, the granular offset lock is released by the file conversion module 126. The plughole procedure is now finished for the current file block of the target virtual disk.

The VM write procedure begins at step 402, where a determination is made by the file system 124 whether the data block at the current offset is plugged. If yes, then at step 412, a write operation to the current file block is executed, which may involve issuing a write command to the address of the current data block of the target virtual disk so that new data is written in the current data block. The VM write procedure is then finished.

However, if the data block is not plugged at the current offset (step 402), the VM write procedure proceeds to step 404, where the granular offset lock is grabbed by the file system 124 for the VM write procedure. Next, at step 406, a determination is made by the file system 124 whether the current block at the current offset is now plugged. If yes, then the VM write procedure proceeds to step 412, where a write operation to the current file block address is executed. The VM write procedure is now finished.

However, if the data block at the current offset is still not plugged, the VM write procedure proceeds to step 408, where a plug file block operation is performed. Next, at step 410, the granular offset lock is released by the file system 124 for the VM write procedure. The VM write procedure then proceeds to step 412, where a write operation to the current block is executed. The VM write procedure is now finished.

Figure 5:
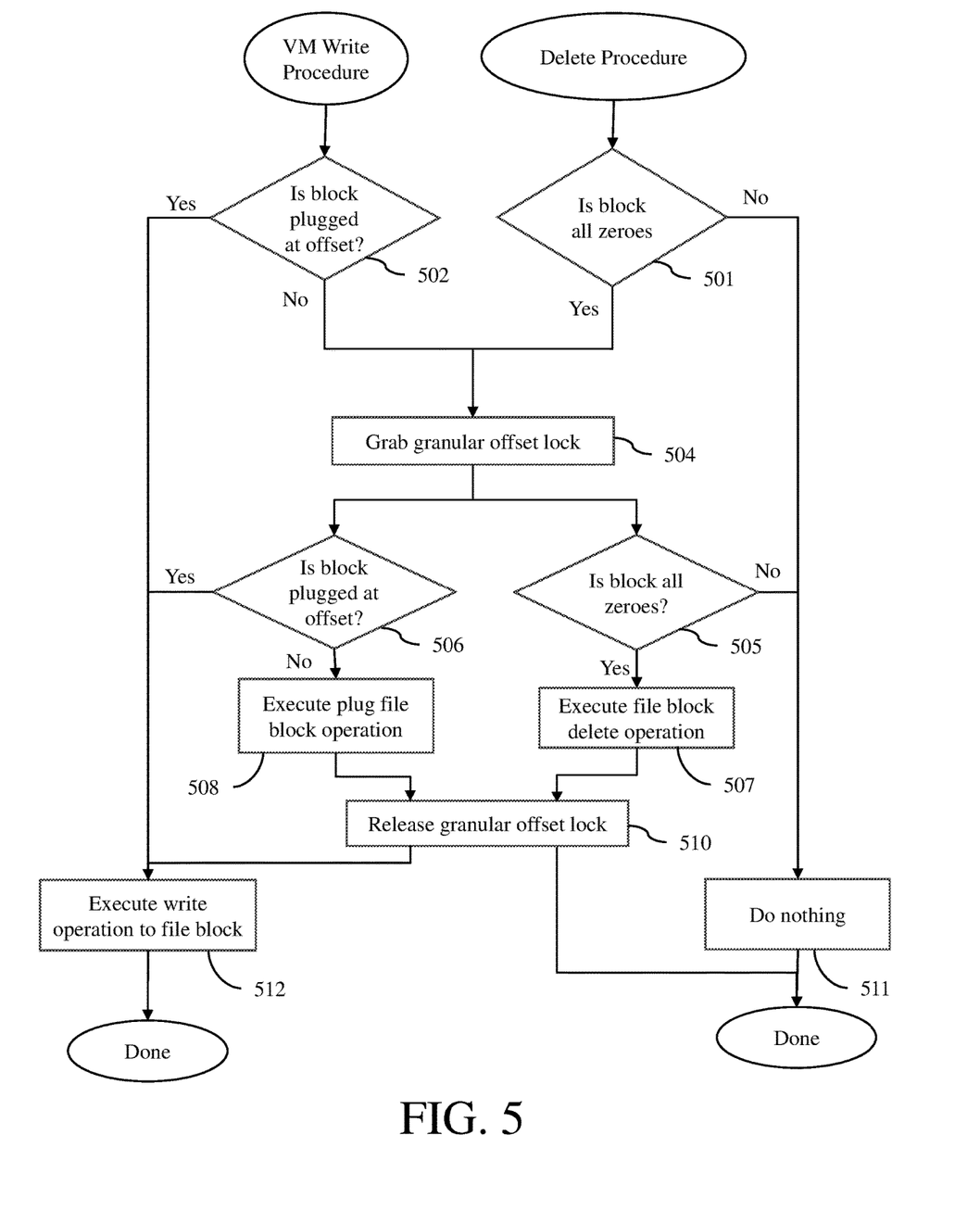
FIG. 5 is a process flow diagram of a delete procedure of the file format conversion process shown in FIG. 3 in accordance with an embodiment of the invention.

The delete procedure of the file format conversion process shown in FIG. 3 in accordance with an embodiment is described with reference to a process flow diagram of FIG. 5, which also shows a VM write procedure that may compete with the delete procedure. The delete procedure begins at step 501, where a determination is made by the file conversion module 126 whether the data block at the current offset contains all zeroes. If no, then no action is taken, at step 511. The delete procedure is then finished for the current data block of the target virtual disk.

However, if the data block at the current offset contains all zeroes, the delete procedure proceeds to step 504, where the granular offset lock for the data block is grabbed by the file conversion module 126. Next, at step 506, a determination is made by the delete procedure whether the current data block still contains all zeroes. If no, which means that a VM write procedure has changed the data in the current data block since step 501, then no action is taken, at step 511, and the delete procedure is finished.

However, if the current data block does contain all zeroes, the delete procedure proceeds to step 507, where a file block delete operation is executed, which results in the file block being deleted from physical storage. Next, at step 510, the granular offset lock is released by the file conversion module 126. The delete procedure is now finished.

The VM write procedure begins at step 502, where a determination is made by the file system 124 whether the data block at the current offset is plugged. If yes, then a write operation to the current file block is executed, which may involve issuing a write command to the address of the current data block of the target virtual disk so that new data is written in the current data block. The VM write procedure is then finished.

However, if the block is not plugged at the current offset (step 502), the VM write procedure proceeds to step 504, where the granular offset lock is grabbed by the file system 124 for the VM write procedure. Next, at step 506, a determination is made by the file system 124 whether the current block at the current offset is now plugged. If yes, then the operation proceeds to step 512, where a write operation to the current block is executed. The VM write procedure is now finished.

However, if the data block at the current offset is still not plugged, the VM write procedure proceeds to step 508, where the file block is plugged and initialized with zeroes. Next, at step 510, the granular offset lock is released by the file system 124 for the VM write procedure. The VM write procedure then proceeds to step 512, where a write operation to the current block is executed. The VM write procedure is now finished.

The plughole procedure and the delete procedure of the file format conversion process described above ensure that the pre-existing data blocks of the target virtual disk with all zeros are not unnecessarily plugged and initialized with zeroes and that recently written VM data is not erased by the file format conversion process. These are achieved without having to power off the VM during the entire file format conversion process and without making a copy of the target virtual disk.

It is noted here that in other embodiments, the target virtual disk may be processed block-by-block using a block size other than 1 MB. In addition, the file format conversion process described herein is not limited to virtual disks, but may be applied to other types of files.

Figure 6:
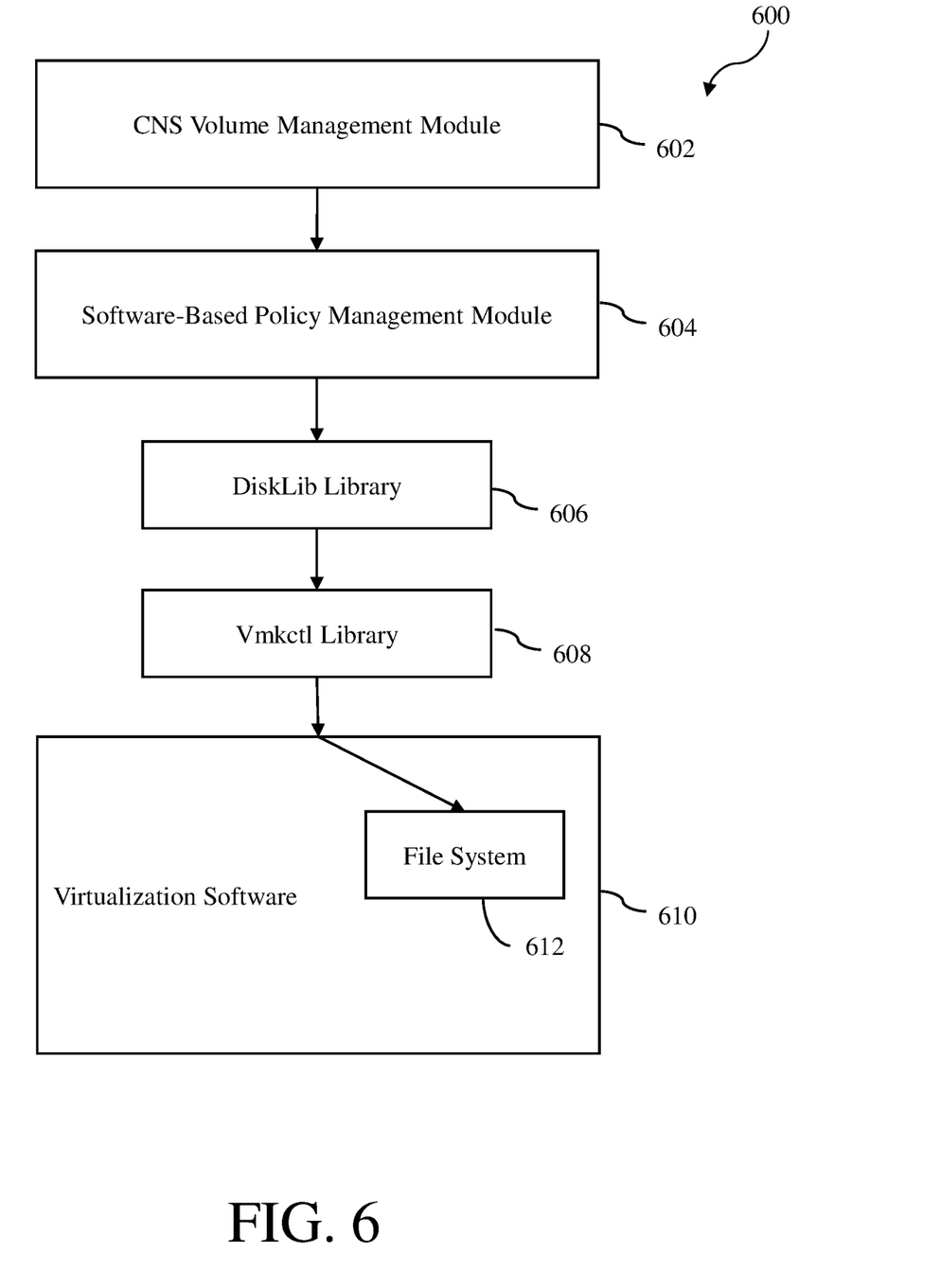
FIG. 6 is a block diagram of a cloud native computing environment in which embodiments of the invention may be implemented.

Turning now to FIG. 6, a cloud native computing environment 600 in which embodiments of the invention may be implemented is illustrated. Cloud native computing is an approach to building and running applications that exploit the advantages of the cloud computing model. It gives an ability to offer on-demand access to computing power along with modern data and application services for developers. Cloud native applications are developed and optimized to run in a cloud as distributed applications. These applications may use containers, service meshes, micro-services, immutable infrastructure, and declarative APIs. In order to provide data services, the applications use volumes that are backed by storage technologies, such as VMware storage technologies. The volumes are basically virtual disks.

As shown in FIG. 6, the cloud native computing environment 600 includes a cloud native storage (CNS) volume management module 602, software-based policy management (SPBM) module 604, a diskLib library 606, a vmkctl library 608 and a virtualization software 610 with a file system 612. The CNS volume management module 602 operates to manage the storage for the cloud native computing environment 600, which includes managing the file formats of the volumes or virtual disks that are used in the environment. The SPBM module 604 operates to manage various software policies that are applicable for managing the compute as well as storage services in the cloud native computing environment. For example, these software policies may include provisioning new volumes, and extend, delete and update policies that are applicable for a set of data volumes. For example, an update policy may change the disk format of virtual disk for a set of volumes for which the policy is applicable.

The API for disk format conversion may be exposed by the diskLib library 606, which is a suite of libraries that manage virtual disk functionalities. These libraries may be backed by any supported backend storage. The diskLib API will in turn call a function in the vmkctl library 608 which actually implements the core functionality of the disk format conversion, as described herein. The vmkctl library 608 may be viewed as being a file conversion module in the cloud native computing environment 600. The vmkctl library 608 may be a thin library on top of the file system 612, which may reside in the kernel of the virtualization software 610. As an example, the virtualization software 610 may be a VMware ESXi™ hypervisor provided as part of the VMware vSphere® solution made commercially available from VMware, Inc. of Palo Alto, Calif.

Figure 7:
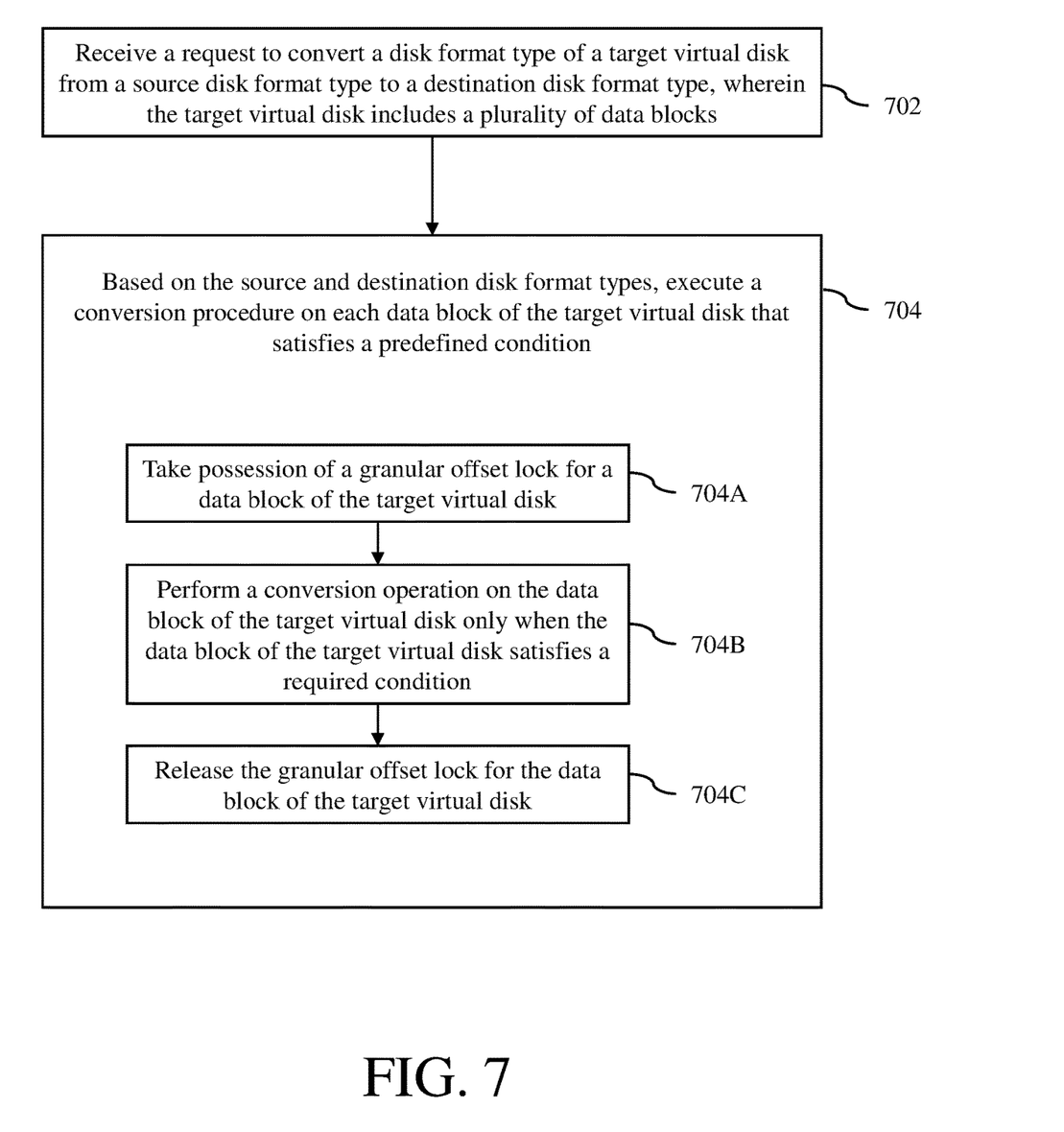
FIG. 7 is a flow diagram of a computer-implemented method for converting disk format types of virtual disks in storage in accordance with an embodiment of the invention.

A computer-implemented method for converting disk format types of virtual disks in storage in accordance with an embodiment of the invention is described with reference to a flow diagram of FIG. 7. At block 702, a request to convert a disk format type of a virtual disk from a source disk format type to a target disk format type is received. The virtual disk includes a plurality of data blocks. At block 704, based on the source and destination disk format types, a conversion procedure is executed on each data block of the target virtual disk that satisfies a predefined condition. The conversion procedure includes taking possession of a granular offset lock for a data block of the target virtual disk (subblock 704A), performing a conversion operation on the data block of the target virtual disk only when the data block of the target virtual disk satisfies a required condition (subblock 704B), and releasing the granular offset lock for the data block of the target virtual disk after the conversion operation on the data block has been performed (subblock 704C).

The components of the embodiments as generally described in this document and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for converting disk format types of virtual disks in storage, the method comprising:
   receiving a request to convert a disk format type of a target virtual disk from a source disk format type to a destination disk format type, wherein the target virtual disk includes a plurality of data blocks; and
   based on the source and destination disk format types, executing a conversion procedure on each data block of the target virtual disk that satisfies a predefined condition, wherein executing the conversion procedure comprises:
      taking possession of a granular offset lock for a data block of the target virtual disk;
      performing a conversion operation on the data block of the target virtual disk only when the data block of the target virtual disk satisfies a required condition; and
      releasing the granular offset lock for the data block of the target virtual disk after the conversion operation on the data block has been performed.

2. The computer-implemented method of claim 1, wherein the predefined condition is when a data block of the target virtual disk being processed contains all zeros and wherein the conversion operation includes one of a plug file block operation and a delete file block operation.

3. The computer-implemented method of claim 2, wherein the conversion operation is the plug file block operation and wherein the plug file block operation is only performed on the data block of the target virtual disk when a determination is made that the data block is not plugged after taking possession of the granular offset lock for the data block of the target virtual disk.

4. The computer-implemented method of claim 3, further comprising:
   receiving a write request for the data block of the target virtual disk from a virtual computing instance running in a computing system; and
   executing the write request for the data block when a determination is made that the data block is plugged or when the data block has been plugged as part of the write request being processed using a granular offset lock for the data block.

5. The computer-implemented method of claim 2, wherein the conversion operation is the delete file block operation and wherein the delete file block operation is only performed on the data block of the target virtual disk when a determination is made that the data block contains all zeros.

6. The computer-implemented method of claim 5, further comprising:
   receiving a write request for the data block of the target virtual disk from a virtual computing instance running in a computing system; and
   executing the write request for the data block when a determination is made that the data block is plugged or when the data block has been plugged as part of the write request being processed using a granular offset lock for the data block.

7. The computer-implemented method of claim 1, wherein an in-memory lock bitmap is used to indicate whether granular offset locks for different data blocks of the target virtual disk are available or unavailable.

8. The computer-implemented method of claim 1, wherein each address of the data blocks of the target virtual disk includes a bit to denote whether that data block is initialized with zeroes or not.

9. A non-transitory computer-readable storage medium containing program instructions for converting disk format types of virtual disks in storage, wherein execution of the program instructions by one or more processors of a computer system causes the one or more processors to perform steps comprising:
   receiving a request to convert a disk format type of a target virtual disk from a source disk format type to a destination disk format type, wherein the target virtual disk includes a plurality of data blocks; and
   based on the source and destination disk format types, executing a conversion procedure on each data block of the target virtual disk that satisfies a predefined condition, wherein executing the conversion procedure comprises:
      taking possession of a granular offset lock for a data block of the target virtual disk;
      performing a conversion operation on the data block of the target virtual disk only when the data block of the target virtual disk satisfies a required condition; and
      releasing the granular offset lock for the data block of the target virtual disk after the conversion operation on the data block has been performed.

10. The non-transitory computer-readable storage medium of claim 9, wherein the predefined condition is when a data block of the target virtual disk being processed contains all zeros and wherein the conversion operation includes one of a plug file block operation and a delete file block operation.

11. The non-transitory computer-readable storage medium of claim 10, wherein the conversion operation is the plug file block operation and wherein the plug file block operation is only performed on the data block of the target virtual disk when a determination is made that the data block is not plugged after taking possession of the granular offset lock for the data block of the target virtual disk.

12. The non-transitory computer-readable storage medium of claim 11, wherein the steps further comprise:
receiving a write request for the data block of the target virtual disk from a virtual computing instance running in a computing system; and
executing the write request for the data block when a determination is made that the data block is plugged or when the data block has been plugged as part of the write request being processed using a granular offset lock for the data block.

13. The non-transitory computer-readable storage medium of claim 10, wherein the conversion operation is the delete file block operation and wherein the delete file block operation is only performed on the data block of the target virtual disk when a determination is made that the data block contains all zeros.

14. The non-transitory computer-readable storage medium of claim 13, wherein the steps further comprise:
receiving a write request for the data block of the target virtual disk from a virtual computing instance running in a computing system; and
executing the write request for the data block when a determination is made that the data block is plugged or when the data block has been plugged as part of the write request being processed using a granular offset lock for the data block.

15. The non-transitory computer-readable storage medium of claim 9, wherein an in-memory lock bitmap is used to indicate whether granular offset locks for different data blocks of the target virtual disk are available or unavailable.

16. The non-transitory computer-readable storage medium of claim 9, wherein each address of the data blocks of the target virtual disk includes a bit to denote whether that data block is initialized with zeroes or not.

17. A computer system comprising:
storage having at least one virtual disk;
memory; and
at least one processor configured to:
receive a request to convert a disk format type of a target virtual disk from a source disk format type to a destination disk format type, wherein the target virtual disk includes a plurality of data blocks; and
based on the source and destination disk format types, execute a conversion procedure on each data block of the target virtual disk that satisfies a predefined condition, wherein an execution of the conversion procedure comprises:
taking possession of a granular offset lock for a data block of the target virtual disk;
performing a conversion operation on the data block of the target virtual disk only when the data block of the target virtual disk satisfies a required condition; and
releasing the granular offset lock for the data block of the target virtual disk after the conversion operation on the data block has been performed.

18. The system of claim 17, wherein the predefined condition is when a data block of the target virtual disk being processed contains all zeros and wherein the conversion operation includes one of a plug file block operation and a delete file block operation.

19. The system of claim 18, wherein the conversion operation is the plug file block operation and wherein the plug file block operation is only performed on the data block of the target virtual disk when a determination is made that the data block is not plugged after taking possession of the granular offset lock for the data block of the target virtual disk.

20. The system of claim 18, wherein the conversion operation is the delete file block operation and wherein the delete file block operation is only performed on the data block of the target virtual disk when a determination is made that the data block contains all zeros.

* * * * *